Fig.1.

May 23, 1944.　　　　　E. B. THOMPSON　　　　　2,349,389
HOIST
Filed Dec. 1, 1943　　　　　4 Sheets-Sheet 4

Inventor
Elmer B. Thompson
Rudolph L. Lowell
by　　　　　atty

Patented May 23, 1944

2,349,389

UNITED STATES PATENT OFFICE 2,349,389

HOIST

Elmer B. Thompson, Des Moines, Iowa, assignor to Globe Hoist Company, Des Moines, Iowa, a corporation of Iowa Application December 1, 1943, Serial No. 512,677

23 Claims. (Cl. 254—144)

This invention relates to automobile hoists and in particular to an automobile hoist comprised of a plurality of relatively movable lifts each of which has a flexible lifting means attachable with an automobile, and means for stabilizing the flexible lifting means in an elevated position to in turn hold the automobile in an elevated position against lateral movement in any direction. This application is a continuation-in-part of my application Serial No. 367,335 filed November 27, 1940, now abandoned.

Automobile hoists now in common use are generally of hydraulic type and comprise essentially a centrally arranged cylinder positioned below the floor level and associated with a lifting piston which is movable from a floor level to an elevated position. These hoists are of two general classes, the "roll-on" type and the "free-wheeling" type. The "roll-on" hoists include metal trough-shaped members fixed to the lifting piston and so shaped that when at a floor level an automobile may be driven upon the troughs with its wheels resting in the troughs. The "free-wheeling" hoists generally have two longitudinal rails carried on the lifting piston for engaging the automobile axles, thus leaving the wheels free.

An objection to these types of hoists is found in the fact that an appreciable part of the under side of the automobile is obstructed or covered by the hoist structure. As a result considerable inconvenience is encountered by a mechanic working on the automobile particularly when his work requires the dropping of the crank case pan, removal of the torque tube, transmission and the like. Where the hoists are used in automobile greasing operations difficulties arise in reaching parts to be greased, and in maneuvering the grease wagons and associated hose connections about the lifting piston and associated trough or rail.

Another objection to automobile hoists of the "free-wheeling" and "roll-on" types is that an automobile must usually be accurately positioned over the hoist rails or troughs to prevent these parts from engaging any of the mechanism at the bottom of the car and to balance the car against sliding on the hoist.

It is an object of my invention, therefore, to provide an improved automobile hoist.

Another object of my invention is to provide an automobile hoist in which no parts of the hoist are located below the automobile so that a free working space is provided underneath the automobile.

Yet another object of my invention is to provide an automobile hoist having automobile-engaging and supporting devices which are movable both longitudinally and laterally of the automobile to be elevated to provide for their attachment with an automobile which is initially positioned laterally or longitudinally a considerable distance away from the center of the hoist.

A further object of my invention is to provide an automobile hoist having a plurality of lifting cables each of which is attachable to an upper portion of the automobile, and operatively associated with an adjustable stabilizing means to hold the automobile against lateral movement at any desired elevation.

Yet another object of my invention is to provide an automobile hoist which is capable of lifting an automobile to any desired elevation and then holding the automobile against lateral movement at such elevation while leaving the entire bottom of the automobile free and open to be worked on.

A still further object of my invention is to provide an automobile hoist which automatically centers the automobile relative to the hoist as the automobile is being elevated.

Another object of my invention is to provide a lift of cable or chain type in which a portion, attachable with an object to be elevated, coacts with a stabilizing unit carried on the lift to maintain the object in an elevated position against lateral movement in any direction.

A feature of my invention is found in the provision of an automobile hoist having a plurality of flexible lifting units attachable with an automobile and supported for relative movement in a horizontal plane so as to automatically center the automobile with the hoist as the automobile is being elevated. Each lifting unit includes a stabilizer device adapted to stabilize the automobile against lateral movement at any desired elevation.

Further objects, features and advantages of my invention will become apparent from the following description when taken in connection with the accompanying drawings in which.

The automobile hoist of my invention includes a substantially rectangular horizontal frame structure which is illustrated in the drawings as supported from the super structure of a garage or the like but which may be carried on four posts, one located at each corner of the frame. The frame comprises a pair of side units, one of which is fixed to the frame end units and the other of which is movably supported on the frame end units for movement toward and away from the fixed side unit. I use four lifts of a substantially like construction in my hoist with a lift being carried adjacent each end of a side unit. One pair of lifts are oppositely arranged at one of the corresponding ends of the side units in fixed positions relative to an associated side unit, while the other pair of lifts at the opposite corresponding ends of the side units are oppositely arranged and movable together longitudinally of an associated side unit.

Each lift includes a supporting block through which is inserted a tubular stabilizing member. The stabilizer may be adjustable in length and depends downwardly below the level of the hoist frame structure. A cable or like flexible means is extensibly supported for movement through each stabilizer and carries a portion at its lower end which is attachable to a lifting ring or the like on a car to be elevated. An attachable portion is receivable within a corresponding stabilizer tube in bearing or contacting engagement with the tube so as to be held by the stabilizer against lateral movement in any direction. As a result the car which is attached to the lower end of the cables is also held against lateral movement when in an elevated position.

By virtue of the flexibility of the cable used in each lift, the cables can be attached to the car when the car is appreciably displaced from a centered position relative to the hoist. Because of the relative movement between the lifts, as provided by their support on the hoist frame structure, the lifts are automatically moved to center the automobile with the hoist concurrently with the lifting of the car to a desired elevation.

In my hoist I use a single motor for concurrently operating all of the four lifts. To stop the lifts at any elevation I provide a switch unit on one of the stabilizer tubes, with the switch unit having an operating arm which extends within the stabilizer tube and into the path of movement of the automobile attachable portion at the lower end of the cable so as to be actuated thereby. It is apparent that the automobile can be automatically stopped at any elevation previously determined by the extensible adjustment of the stabilizers.

My hoist thus eliminates completely the use of any lifting piston and associated structure which is located below the car for engaging any of the underside parts of the car. As a result the floor space immediately below the car, as well as the under side of the car, is completely open so that a mechanic has a free working space for himself, and for his tools and equipment. Also since the automobile is stabilized against lateral movement in an elevated position the usual loosening and tightening of bolts and the like, or hammering which takes place in most repair and service work, can be efficiently accomplished since these operations produce no lateral movement of the car.

I have shown my hoist applied to a car of future design having lifting rings on the bumpers to which the lifts are attached. In this car the design contemplates a streamlining of the underside of the car which might interfere with the rails and troughs used on present type "roller" and "free-wheeling" hoists. However, it is readily appreciated that my hoist is also applicable to present day cars by attaching the lifts directly to the bumpers or supporting braces for the bumpers.

Figure 1:
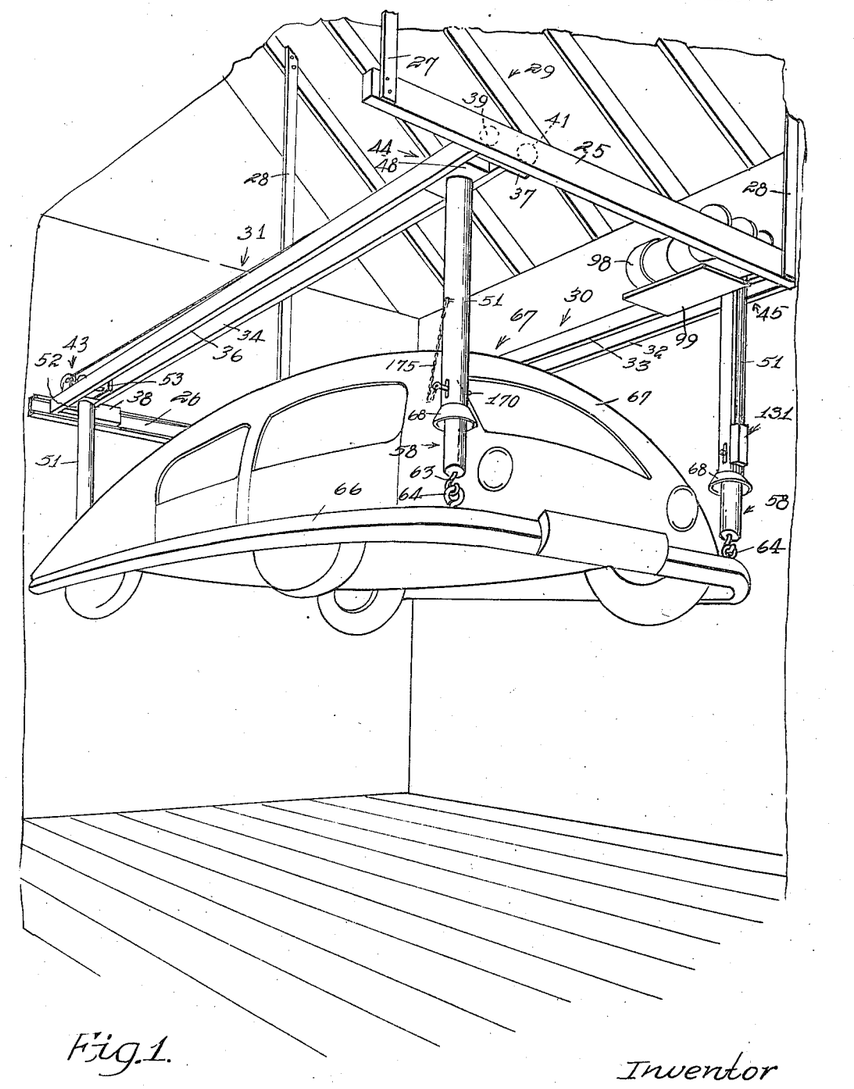
Fig. 1 is a bottom perspective view of the automobile hoist of my invention showing an automobile in an elevated position thereon.
Figure 2:
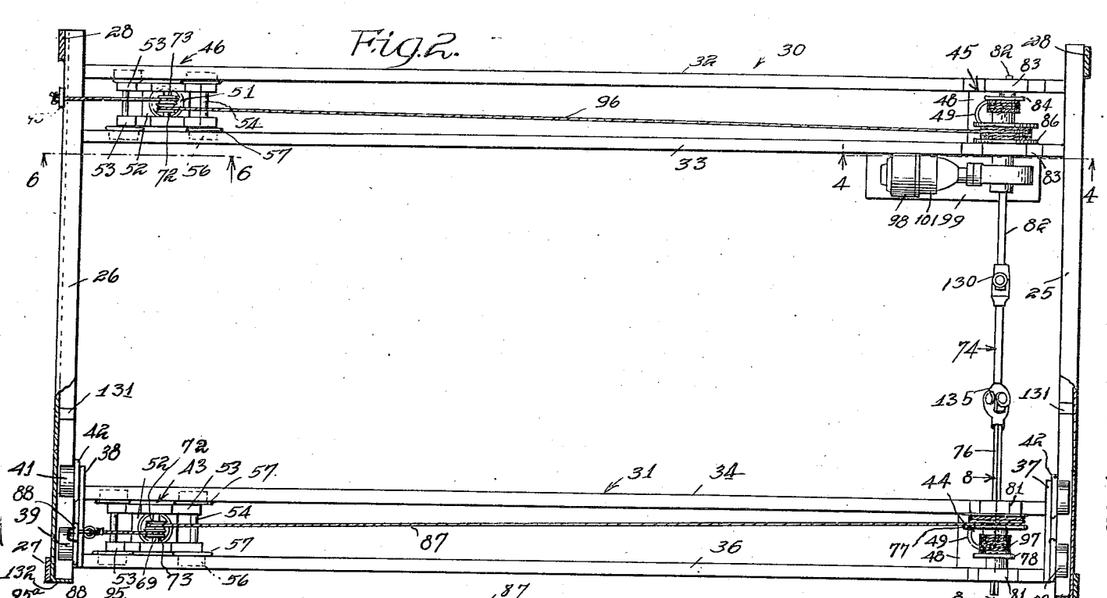
Fig. 2 is a plan view of the hoist.
Figure 3:
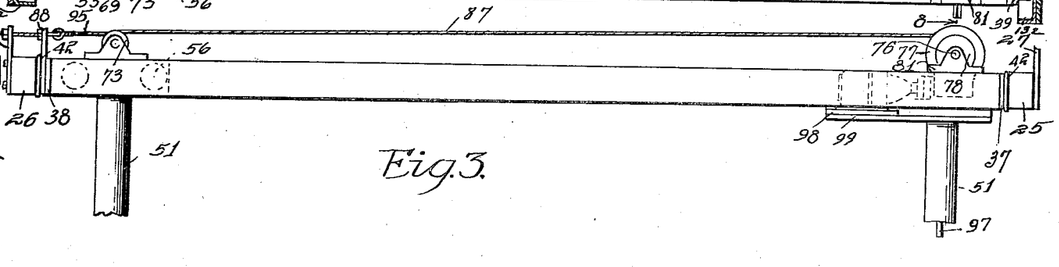
Fig. 3 is a shortened side elevational view of the hoist.

With reference to the drawings the automobile hoist of my invention is shown in Figs. 1, 2 and 3 as including a frame of substantially rectangular shape having a pair of transversely extended end beams 25 and 26 of a channel construction opening inwardly of the frame. Each end beam 25 and 26 is carried by supporting members 27 and 28 depended from a super structure, indicated generally as 29, for a garage or the like in which the hoist is to be used.

The frame side units 30 and 31 are each comprised of a pair of spaced parallel channel beams 32 and 33, and 34 and 36, respectively. The side unit 30 is supported at its ends in a fixed position on the end beams 25 and 26. The beam members 34 and 36, of the side unit 31, are rigidly connected together at their corresponding ends by upright plates 37 and 38. Each plate 37 and 38 constitutes a bearing support for a pair of rollers 39 and 41 which are rollable within a corresponding channel end beam or track 25 and 26, to provide for a movement of the side unit 31 laterally relative to the side unit 30. The rolling engagement of the rollers 39 and 41 with both legs of a channel beam or track 25 and 26 holds the side unit 31 for lateral movement in a horizontal plane, with each roller 39 and 41 having an annular flange 42 in bearing engagement with the free ends of the channel legs to retain the side unit 31 against longitudinal movement relative to the tracks 25 and 26.

The frame carries four lifting units 43, 44, 45 and 46, with a lifting unit being adjacent each end of a side unit 30 and 31. The lifting units 44 and 45 are located opposite each other and are fixed on a corresponding side unit 30 and 31, and the lifts 43 and 46 are supported for movement longitudinally of a corresponding side unit 30 and 31. Since the lifts 44 and 45 are supported on an associated side unit 30 and 31, respectively, in the same manner only the support of the lift 45 will now be described in detail.

Supported between the channel beams 32 and 33 of the side unit 30 is a block member 48 having a substantially centrally located opening 49 extended vertically therethrough and adapted to snugly receive a tubular stabilizing member 51 one of which is included in each lift 43—46 (Figs. 2, 3, 4 and 5). The stabilizer 51 has its upper end substantially flush with the top of the opening 49 and depends downwardly from the block 48 between the channel beams 32 and 33. It is contemplated that the stabilizer be in a press fit engagement with the side wall of the opening 49 over a distance sufficient to rigidly hold the stabilizer in the block 48. To assure this rigidity the stabilizer 51 is welded to the block 48 at the ends of the opening 49.

The lifts 43 and 46 are movably supported in a like manner on a side unit 30 and 31, so that only the support of the lift 46 will be referred to in detail. The stabilizer 51 for the lift 46 extends through a block member 52 and depends therefrom between the channel beams 32 and 33 (Figs. 2, 3, 6 and 7). The block 52 has each of its opposite longitudinal sides welded or otherwise secured within a channel plate 53, with the over-all width of the channel plates 53 and block 52 being less than the distance between the channel beams 32 and 33 to provide for a free travel of the plate and block assembly longitudinally of and between the beams 32 and 33.

Figures 4, 6, 7:
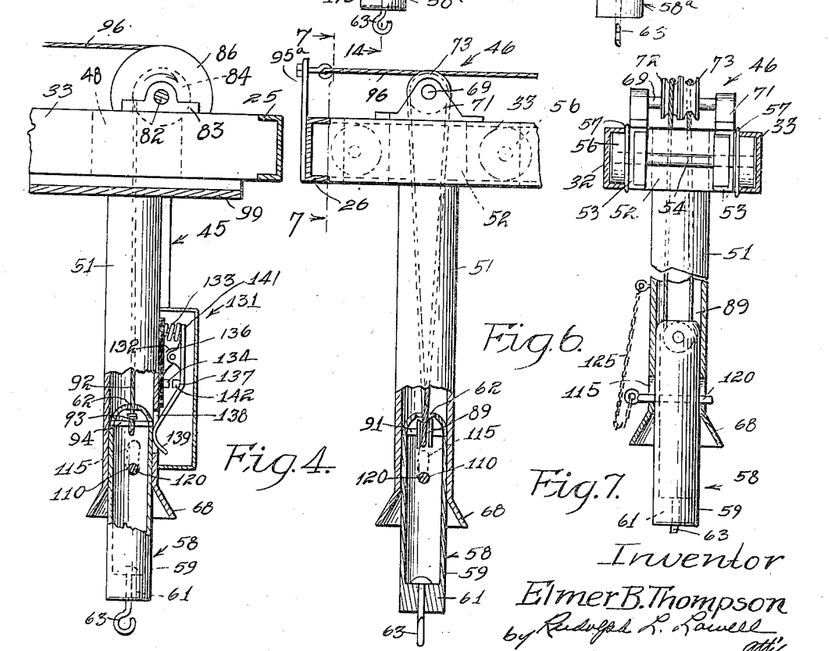
Fig. 4 is an elevational side view of one of the hoist lifts as seen along the line 4—4 in Fig. 2.
Fig. 6 is an elevational side view of a lift as seen on the line 6—6 in Fig. 2.
Fig. 7 is a sectional view taken along the line 7—7 in Fig. 6.

Each block and plate assembly 52—53 carries a pair of shafts 54 for rotatably supporting rollers 56. The channel beams 32 and 33 are open toward each other and receive rollers 56 for rolling engagement with each of the legs of a beam 32 and 33. A flange 57 for a roller 56 is in bearing engagement with the free ends of the channel legs to prevent movement of the block 52 laterally between the channel beams 32 and 33, the engagement of a roller 56 with opposite channel legs of an associated beam 32 and 33 maintaining the block against vertical movement relative to the beams 32 and 33.

It is seen, therefore, that the side unit 30 is fixed relative to the end beams 25 and 26 which constitute tracks for the side unit 31 to provide for its movement in a substantially parallel relation toward and away from the side unit 30. The lifts 44 and 45 are in fixed positions adjacent corresponding ends of the side units 30 and 31, which in turn constitute tracks for the lifts 43 and 46 to provide for their movement longitudinally of an associated side unit 31 and 30, and toward and away from a lift 44 and 45, respectively. The lift 45, therefore, is the only stationary lift in the hoist, while the remaining lifts 43, 44 and 46 are movable relative to each other and to the lift 45 for a purpose which will be later explained.

Each pair of lifts 43 and 44, and 45 and 46, mounted on a corresponding side unit 31 and 30, respectively, are of a similar construction and operatively associated together in a like manner so that only the pair of lifts 45 and 46 on the side unit 30 will be referred to in detail.

Each lift 45 and 46 has a lower unit 58, attachable to a car, which comprises a cylindrical member 59 of a hollow construction and formed with a flat closed bottom 6 and a substantially semi-spherical shaped top having a central opening 62 (Figs. 4, 6 and 7). A hook 63, in a swivel connection with the bottom 61 of the member 59, is adapted for attachment with a lifting ring 64 carried on the bumper 66 of a car 67 as illustrated in Fig. 1. The bottom 61 is of a relatively thick or heavy construction to adequately support the hook 63 against lateral and pivotal movement. The hook 63 is of a size such that it is entirely within the outer peripheral confines of the member 59.

The member 59 is receivable within the lower end of an associated stabilizer 51 and in bearing engagement with the inner wall of the stabilizer. Reception of the member 59 within the stabilizer is facilitated by a bell shape of the stabilizer lower end 68 which coacts with the semi-spherical top of the member 59 to guide the member 59 within the straight tubular portion of the stabilizer. The length of the member 59 within the stabilizer 51 is such that sufficient bearing engagement is provided with the stabilizer member to hold the member 59 against lateral movement in any direction relative to the stabilizer. In other words varying lengths of the member 59, beyond a predetermined minimum length, may be extended within the stabilizer. As a result the member 59 is movable within the stabilizer 51 between relatively wide limits and held against lateral movement at any moved position between these limits.

Located above the top of the block member 52 for the lift 46 is a shaft 69 which extends laterally of the side unit 30 and is rotatably supported in bearings 71 carried on the channels 53 (Figs. 2, 6 and 7). A pair of like pulleys 72 and 73 are mounted on the shaft 69 in a position above the tubular stabilizing member 51 for the lift 46.

Figures 5, 8, 13:
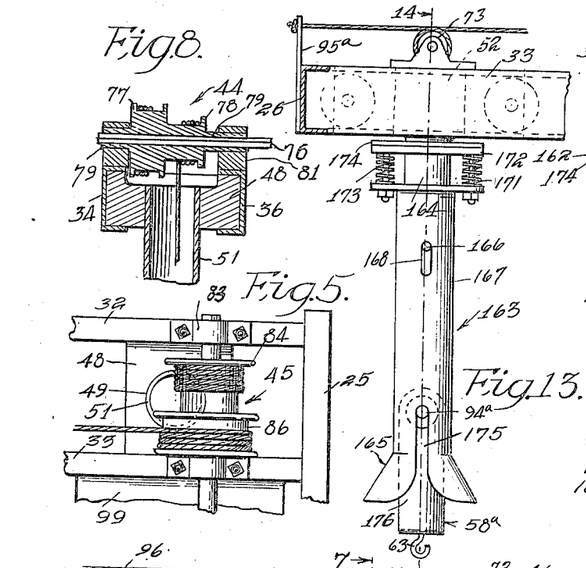
Fig. 5 is a plan view of the hoist lift shown in Fig. 4.
Fig. 8 is a sectional view as seen on the line 8—8 in Fig. 2.
Fig. 13 shows a modified form of lift for the hoist of this invention.

A shaft 74 for the lift 45 is also common to the lift 44 and constitutes a drive shaft for all four of the lifts 43, 44, 45 and 46. The shaft 74 extends transversely of the hoist and its end portion 76 at the lift 44 is of a square cross section. The end portion 76 carries a pair of pulleys 77 and 78 of integral construction having hubs 79 projecting outwardly from each end thereof (Figs. 2 and 8). The pulley 77 has a diameter substantially twice the diameter of the pulley 78 for a purpose which will become apparent later on. The pulley unit has a central square-shaped bore for receiving the shaft end portion 76, with the hubs 79 being rotatably supported in bearings 81 carried on the beams 34 and 36 of the side unit 31. It is thus seen that the pulleys 77 and 78 are capable of movement axially of the shaft 74 concurrently with their rotation with the shaft, this axial movement taking place when the side unit 31 is moved along the tracks or end beams 25 and 26.

The opposite end 82 of the shaft 74 is rotatably supported in bearings 83 carried on the channel members 32 and 33 of the side unit 30 (Figs. 2, 4 and 5). A pair of pulleys 84 and 86 are mounted on the shaft end 82 above the stabilizer tube 51 for the lift 45 and are of a relative size corresponding to the pulleys 78 and 77, respectively, for the lift 44.

A cable 96 for concurrently lifting the lower units 58 of the lifts 45 and 46 at the same rate of speed is connected at one end to an upright 95a on the channel beam 26 (Figs. 2, 3 and 6). The cable is then passed over the pulley 73 and downwardly through the stabilizer 51, for the lift 46, about a pulley 89 located within the hollow member 59 and rotatably supported on a shaft 91 carried in the side wall of the member 59. From the pulley 89 the cable travels upwardly through the stabilizer 51, over the pulley 72 and then to the pulley 86 for the lift 45 to which its opposite end is connected, the pulley 86 operating as a winding drum for the cable 96.

A second cable 92 has one end 93 projected through the opening 62 in the lower member 59 for the lift 45 for connection with a rod 94 located within the member 59 and supported at its ends in the side wall thereof (Figs. 2, 4 and 5). The cable 92 then extends upwardly through the stabilizer 51 and is wrapped around the pulley 84 to which its opposite end is connected. On rotation of the shaft 74, therefore, both units 58 of the lifts 45 and 46 are raised and lowered at the same rate of speed.

As is clearly illustrated in Fig. 4 the unit 58 for the lift 45 is elevated at a speed equal to the peripheral speed of the pulley 84 due to its attachment with the end 93 of the cable 92. However, the unit 58 for the lift 46 is elevated at a speed proportional to the peripheral speed of the pulley 86 by virtue of the cable 96 and pulley system associated therewith. This pulley system, if the winding pulleys 86 and 84 for the cables 96 and 92, respectively, were of the same size, would provide for the unit 58 of the lift 46 being elevated only half as fast as the unit 58 for the lift 45. However, by having the diameter of the pulley 86 substantially equal to twice the diameter of the pulley 84, the units 58 for the lifts 45 and 46 are elevated at the same rate of speed.

Cables 87 and 97 are associated with the lifts 43 and 44, respectively, in all ways similar to the assembly of the cables 96 and 92 with the lifts 46 and 45, respectively, except that the end 95 of the cable 87 is attached to a bracket 88 secured to the bearing plate 38 (Figs. 2 and 3). A further description of the cables 87 and 97 relative to the lifts 43 and 44, is, therefore, believed to be unnecessary. Since the winding pulleys 77 and 78 for the cables 87 and 97, respectively, are rotatable with the driving shaft 74 it is apparent that all of the attachable units 58 for the lifts 43—46 are elevated at the same rate of speed on rotation of the driving shaft 74.

Figures 9, 10, 11:
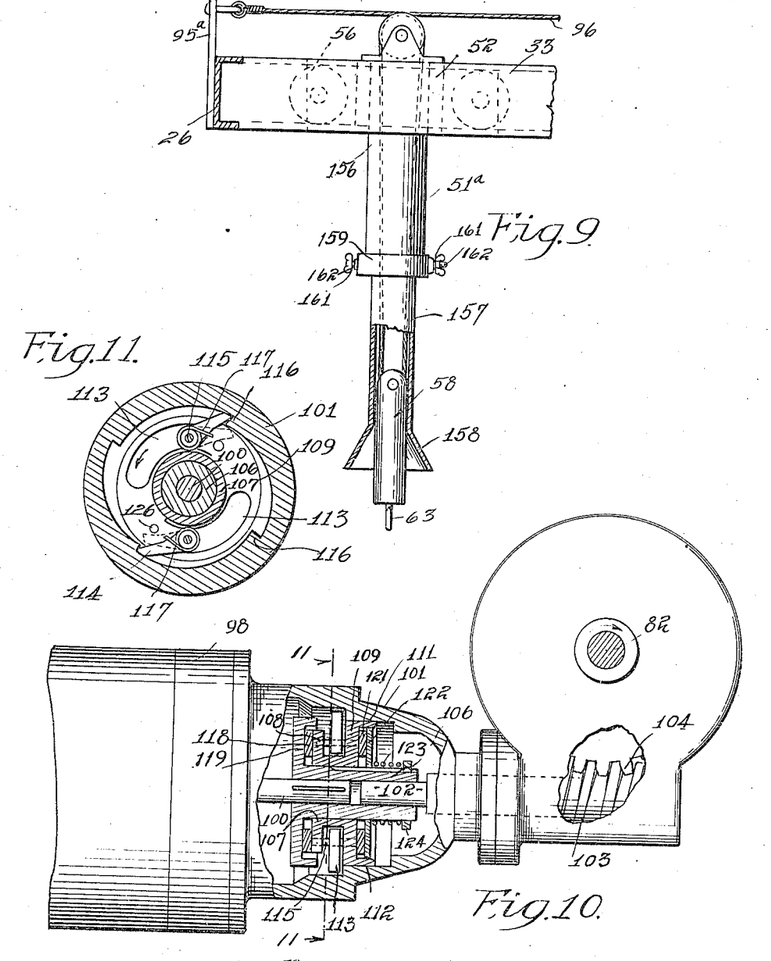
Fig. 9 is an elevational side view of a lift illustrated similarly to Fig. 6 and showing a modified form of lift stabilizer means.
Fig. 10 is an enlarged detail view of the hoist operating motor and power transmission means shown in Fig. 2, with some parts being shown in section and other parts broken away to more clearly show their construction.
Fig. 11 is a sectional view taken on the line 11—11 in Fig. 10.

The operation or driving of the shaft 74 to accomplish a concurrent elevating and lowering of the attachable units 58 is accomplished by an electric motor 98 carried on the side unit 30 adjacent to the lift 45. The motor is mounted on a supporting plate 99 welded or otherwise secured to the channel beam 33 (Figs. 1, 2, 3 and 4). The motor is of a reversible type and has one end of its shaft 100 projected into a housing 101, continuous with the motor housing, for enclosing a coaster brake assembly (Figs. 10 and 11). The shaft 100 is connected through the coaster brake assembly with a worm shaft 102 having a worm 103 which is in continuous meshing engagement with a worm gear 104 mounted on the drive shaft end 82.

The coaster brake assembly includes a coupling sleeve 106 which is mounted on and keyed to the adjacent ends of the motor shaft 100 and the worm shaft 102. Rotatably supported on the coupling sleeve 106 is a collar 107 having an annular flange 108 and 109 at opposite ends, with the flange 109 being integrally formed with an annular axial extension 111 which is in bearing engagement with a bearing portion 112 provided on the inner periphery of the housing 101.

Supported in the flanges 108 and 109, in an angularly spaced relation, are pins 115 for pivotally supporting corresponding pawls 113 located between the flanges 108 and 109. Each pawl is integrally formed with a weighted end portion and an opposite end portion 114 movable into engagement with angularly spaced teeth or ratchet portions 116 projected inwardly from the inner periphery of the housing 101. A spring 117 is operatively associated with each pawl 113 to bias its end portion 114 into an engaging position with a tooth 116.

The flange 108 carries a brake ring 118 on its outer side which is in frictional engagement with a plate portion 119 integral with the coupling sleeve 106 and located on the end of the sleeve which is adjacent to the motor 98. A second brake ring 121 is carried on the outer side of the flange 109 and frictionally engages a plate member 122 keyed on the coupling sleeve 106. The frictional pressure between the brake ring 118 and the plate 119, and between the brake ring 121 and the plate 122, is maintained by a coil spring 123 mounted on the sleeve 106 and compressed between the plate 122 and a collar 124 supported on the sleeve 106 at its end adjacent to the worm 103.

To elevate the attachable units 58 the motor 98 is rotated in a direction such that the shaft 100 is rotated in a counterclockwise direction, as indicated by the arrow in Fig. 11, which in turn rotates the drive shaft end 82 in a clockwise direction as shown by the arrows in Figs. 4 and 10. When the motor 98 is thus rotated the pawls 113 are freely movable out of engaging positions with the teeth 116. The pawls, sleeve 106, collar 107, brake rings 118 and 121 and plate members 119 and 122 thus rotate as a unit with the motor shaft 100 and worm shaft 102 by virtue of the frictional engagement of the brake rings 118 and 121 with the plate members 119 and 122, respectively.

After the motor is operated the weighted end portions of the pawls 113 are moved outwardly by centrifugal force to in turn move the pawl end portions 114 inwardly and out of engaging positions with the teeth 116. The inward movement of a pawl end 114 is limited by its engagement with a corresponding stop pin 126 projected outwardly from the inside face of the flange 109. It is thus seen that when the lifts are elevated the coaster brake assembly rotates with the motor shaft 100 and worm shaft 102 and functions only as a coupling means between these two shafts.

When the attachable units 58 are elevated to a desired position and the motor 98 is stopped the pawls 113 are moved by their associated springs 117 into positions for engaging corresponding teeth 116. On a reverse rotation of the motor, which rotates the motor shaft 100 in a clockwise direction as viewed in Fig. 11, the pawls are moved into engagement with the teeth 116. However, the attachable units are maintained in their elevated positions by the mechanical friction in the worm wheel and gear assembly 103 and 104 as is well known in the art.

If for some reason this mechanical friction between the worms 103 and 104 should fail or should a cable 87, 97, 96, or 92 break, each lift is provided with a similar safety lock which is shown in Figs. 4, 6 and 7 as applied to the lifts 45 and 46. The member 59, of an attachable unit 58, is formed adjacent its upper end with a pair of opposite aligned openings 110. A corresponding stabilizer tube 51 is provided with a pair of opposite aligned axially extended slots 115. On movement of the attachable unit 58 to a predetermined elevation the openings 110 are aligned with the slots 115. A pin 120, which can be carried on a chain 125 supported on the stabilizer tube 51, is extended through the openings 110 and slots 115. Thus on the occurrence of any of the failures above mentioned, the pin 120 will move to a supported position at the bottom of the slots 115 to maintain the attachable unit 58, and in turn a car supported on the units 58, in an elevated position independently of the motor 98 and associated power transmission mechanism.

With the pins 120 removed it is apparent that the load on the attachable units 58, such as the car 67, illustrated in Fig. 1, will descend or fall as soon as the mechanical friction of the worm wheel 103 and worm gear 104 is reduced or eliminated. In order to control the descent of the car the coaster brake assembly is held by the pawls 113 against rotating with the shafts 100 and 102 in the manner above described. Thus when the motor 98 is reversed to lower the car, the motor operates against the frictional pressure created by the coaster brake assembly. The coaster brake assembly, therefore, produces a drag on the motor 98 so that the descent of the car is controlled directly by the operation of the motor 98.

In the operation of the hoist all of the lifts 43—46 are initially moved to their elevated positions, as shown in Fig. 1, to provide an open space for a car beneath the hoist. A car is then driven to a substantially centered or "spotted" position below the hoist. It is not necessary that the car be positively centered for reasons which will appear later on. With the car in position below the hoist the units 58 are lowered until the hooks 63 are capable of being attached to corresponding lifting rings or the like 64 on the car.

When all of the hooks 63 are attached to the car 67 the units 58 are concurrently lifted by the motor 98 in the manner explained above. Due to the fact that some of the lifts will begin to take the load of the car before others of the lifts, some sliding of the car across the floor may take place before it is raised from the floor. However, as the lifts 43 and 44 begin to assume a part of the car load there may be a tendency to move the side unit 31 laterally relative to the side unit 30 to provide for a location of each of the lifts vertically above a corresponding attachable unit 58. As a result of the same action the lifts 43 and 46 may move longitudinally of a corresponding side unit 30 and 31. By virtue of this movement of the lifts 43, 44 and 46 the car 67 is automatically centered relative to the hoist structure concurrently with its being elevated, the lateral movement of the side unit 31 accommodating the hoist to cars having lifting rings or the like 64 secured at different positions transversely of the car, while movement of the lifts 43 and 46 longitudinally of a corresponding side unit 31 and 30, respectively, accommodates the hoist to cars of varying lengths.

When a car is initially driven below the hoist at a position which is relatively far removed laterally of the hoist the side unit 31, when the car is raised may cant or tilt between the track members 25 and 26. In some instances this canting action may reach proportions such that the side unit 31 will tend to bind between the tracks 25 and 26. To appreciably reduce the effect of this binding action each track 25 and 26 is provided with a stop member 131 to limit the inward movement of the side unit 31 toward the side unit 30. Similarly each track 25 and 26 carries a stop 132 at its end adjacent the side unit 31 to prevent the side unit 31 from travelling off of the tracks 25 and 26. It is contemplated that the stops 131 and 132 be spaced apart a distance longitudinally of a corresponding track 25 and 26 to provide a maximum travel of the side unit 31 of about ten inches. This range of travel of the side unit 31 is sufficient to accommodate the hoist to the widths of all present commercial cars and cars contemplated for future use.

Since a tilting of the side unit 31 will also laterally move the end 76 of the drive shaft 74, universal joints 130 and 135 pivotally movable in planes at right angles to each other, are connected in the shaft 74. Any binding of the shaft portion 76 with the pulleys 77 and 78 is thus eliminated so that these pulleys are always freely slidable axially of the shaft 74.

By virtue of the automatic centering of the car 67 relative to the hoist, concurrently with the raising of the car off of the ground, a lower unit 58 of each lift is automatically positioned vertically below a corresponding stabilizer tube 51 so as to be readily received within the lower end 68 of a stabilizer. On a continued elevation of the lifts, therefore, a lower unit 58 is received within a corresponding stabilizer 51 until a sufficient length of a unit 58 is within a stabilizer tube to prevent any lateral movement of a unit 58 relative to a stabilizer. As a result, although a flexible or cable type lifting means is used in each lift, the flexibility of the lifting means is eliminated as soon as a lower unit 58 is received within a stabilizer 51 so that the car 67 in turn is held against any lateral movement.

It is further apparent from a consideration of Fig. 1 that by virtue of each lift being depended from an overhead frame structure and attached to an upper portion of the car 67 that there is no part of the hoist structure which is located below the car when the car is in its elevated position. The floor spaced below the car and about the car is thus entirely open so that dollies, grease wagons and the like may be freely moved about. It is also clear that when relatively large units of the car are to be removed, such as the oil pan, front axle, torque tube, transmission or differential, they may be freely dropped on to receiving platforms without interference from any of the hoist structure. Since the car is firmly held against lateral movement in any direction by the cooperative action of a lower unit 58 and a stabilizer 51 all mechanical work can be readily accomplished without producing any swinging action of the car.

As is well known in the automobile hoist art it is usually desirable that the hoist be manually started and then automatically stopped when the car is elevated to a suitable position at which work can be easily performed on its under side. This is accomplished in the present invention by the provision of a stop switch unit 131 carried on one of the lifts and shown in Figs. 1 and 4 as being on the lift 45.

With reference to Fig. 4 the switch unit 131 is illustrated as including an electrical insulating panel board 132 having a coil spring 133 secured adjacent one of its ends and an electrical contact 134 fixed adjacent an opposite end. A support 136 carried on the panel board 132 intermediate the spring 133 and contact 134 pivotally supports a contact arm 137. The panel board 132 is attached to the outer side of the stabilizer 51 and adjacent an opening 138 in the stabilizer for receiving the end 139 of the arm 137. The arm end 139 is of a cam shape for engaging the member 59 of the unit 58 and is biased to a position within the opening 138 and in the path of travel of the unit 58 by the action of the spring 133 acting on the arm end 141. A contact 142 carried on the arm 137 is in contact engagement with the contact 134 when the arm end 139 is in a position within the stabilizer tube 51. As a result the contacts 134 and 142 are in a normally closed position, to in turn close the operating circuit for the motor 98, with the travel of the unit 58 within the stabilizer 51 engaging and moving the arm end 139 to open the contacts 134 and 142 to stop the motor 98. Since the motor 98 operates all of the four lifts in the hoist the single switch unit 131 is effective to concurrently control the lifting action of all of the lifts.

Figure 12:
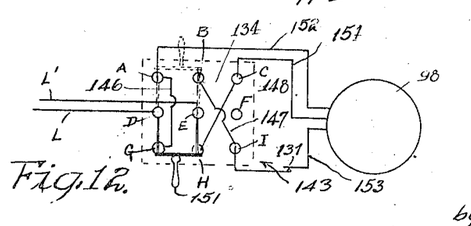
Fig. 12 is a diagrammatic control circuit for the hoist-operating motor.

The operation of the switch unit 131 is best understood from a consideration of the control circuit in Fig. 12. The main control panel 143 for the hoist has nine terminals, A—I, inclusive, arranged as shown. The terminals A and G are connected together by a conductor 146, terminals B and I by a conductor 147, and terminals H and C by a conductor 148. Power for operating the motor 98 is supplied from a suitable source through supply lines L and L' which are connected to terminals D and E, respectively. A master switch 151 of double-pole double-throw type is electrically connected and pivoted at the terminals D and E.

To operate the motor 98 for elevating the units 58 the switch 151 is moved to its dotted line position shown in Fig. 12. This closes a circuit from the supply line L at the terminal D through the switch 151 to the terminal A and through a conductor 152 to the motor 98. The return line from the motor 98 includes a conductor 153, in which the switch 131 is connected, terminal I, the conductor 147, terminal B, switch 151 and terminal E which is attached to the supply line L'. On opening of the switch unit 131, in the manner above described, the return line from the motor 98 to the supply line L' is opened at the conductor 153 to in turn stop the operation of the motor.

When it is desired to lower the lifts the switch 151 is moved to its full line position shown in Fig. 12. When in this position the circuit of the motor from the supply terminal D is closed through the switch 151, conductor 146, terminal A, conductor 152, the motor 98, conductor 154, terminal C, conductor 148, terminal H, the switch 151 and the terminal E which is attached to the supply line L'. It is apparent, of course, that on operation of the motor 98 in a reverse direction, to lower the units 58, the switch unit 131 is returned to its closed position. The circuit for operating the motor to elevate the units 58 is thus closed after the contact arm 137 of the switch unit 131 is out of engagement with the lower unit 58 of the lift 45.

The hoist has been described thus far as operating to lift a car to a desired elevation defined by the actuation of the switch unit 131 when the units 58 are far enough within corresponding stabilizers 51 to be retained against lateral movement. In some instances, however, it may be desired to raise and stabilize the car at any desired elevation. This condition may arise, for example, where only the wheels of the automobile are to be serviced, so that it would only be necessary to raise the car enough to lift it off the floor. The lifting and stabilizing of the car at any desired position is accomplished by means of the stabilizing unit 51a shown in Fig. 9 as applied to the lift 46.

The unit 51a includes an upper tubular sleeve member 156 which is rigidly carried in the block 52 in a manner similar to the stabilizing member 51. Telescoped within the member 156 for adjustment to extended positions from its lower end is a bottom tubular stabilizing member 157 having a bell-shape lower end 158. A collar 159 mounted about the lower end of the stablizer member 156 carries a pair of oppositely positioned friction screws 161 which extend through the member 156 and into frictional engagement with the member 157. The adjustment of the screws 161 to hold and release the member 156 is accomplished by nuts 162 associated with each screw 161.

In the use of the stabilizing unit 51a the hoist is operated in all respects as described above except that the master control switch 151 is manually operated to an open position to stop the operation of the motor 98 when the car 67 has been elevated to a certain height above the floor. This height may be reached before the car attachable units 58 have been received within corresponding lower stabilizer members 157 so that the car is free to swing in a lateral direction. To maintain the car against lateral movement the nuts 162 are loosened to release the member 157 so that it drops downwardly into a position to receive a lower unit 58. The nuts 162 are then tightened to again hold the members 156 and 157 against relative longitudinal movement.

By virtue of the telescopic assembly of the members 156 and 157, and the rigid support of the member 156 in the block 52 the car 67 is effectively held against lateral movement in any direction at its adjusted position. It is to be understood, of course, that the extent of telescopic engagement of the members 156 and 157 can be varied between wide limits to provide for a stabilization of the car 67 at any height between a raised position immediately above the floor and a position of maximum elevation for the hoist. It is apparent also that the lower tubular member 157 may be adjusted to an extended position prior to the raising of the car 67, and the car automatically stopped at a height, corresponding to such adjustment by the provision of a switch unit 131 on the lower tubular member 157.

Figure 14:
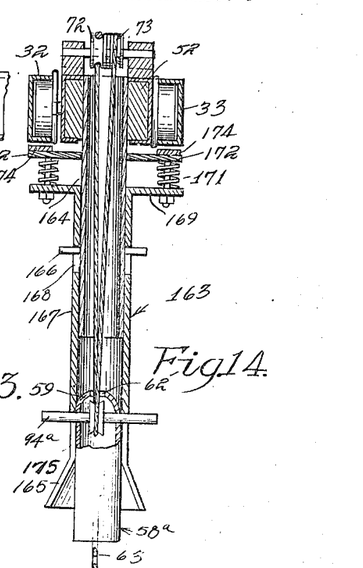
Fig. 14 is a sectional view as seen along the line 14—14 in Fig. 13.

A modified form of the invention is shown in Figs. 13 and 14 which is similar in all respects to the hoist structure of Figs. 1, 2 and 3 except for the construction of the stabilizer and a corresponding attachable unit at the lower end of a lift. Similar numerals of reference will be used, therefore, to designate like parts.

Referring to Figs. 13 and 14 the lift 163 is adapted to be substituted for the lifts 43 and 46 in Fig. 2 and will be described with respect to the side unit 30. The lift 163 includes a rigid stabilizing tube 164 carried in a block 52 in a manner similar to the stabilizer 51. Outwardly extended from the stabilizer tube 164 are a pair of oppositely arranged pins 166. Slidingly mounted on the tube 164 is a sleeve 167 having slots 168 therein through which the pins 166 are extended, thereby providing a limited sliding movement of the sleeve 167 axially relative to the tube 164. The lower end of the sleeve 167 extends beyond the lower end of the tube 164. At the top of the sleeve 167 is a flange 169 of a substantially rectangular shape having oppositely arranged pairs of springs 171 thereon. Supported on the top of the springs 171 is a rectangularly shaped plate member 172. A bolt 173 is extended through each spring 171, with the top end of a bolt being connected to the plate 172, and its bottom end being slidable through the plate 169 so that the springs 171 are compressible between the plates 169 and 172. Brake or friction members 174 are carried on top of the plate 172 adjacent to but normally out of contact with the bottom of the channel members 32 and 33 of the side unit 30.

The lower end 165 of the sleeve 167 is of a bell shape having oppositely arranged, substantially inverted V-shaped notches 176, with each notch terminating in a slot 175 which extends axially of the sleeve 167. The car attachable unit 58a is similar in all respects to the unit 58 in the lifts 43 and 46 except that the shaft 94a in the unit 58a projects outwardly from opposite sides of the member 59. The shaft 94a is of a length greater than the largest diameter of the bell-shaped sleeve end 165 and is adapted to be guidably received in the V-shaped notches 176, on movement of the unit 58a within the lower end of the sleeve 167, for location in the slots 175.

By this arrangement when the automobile 67 has been elevated to substantially its maximum height the shaft 94a engages the upper ends of the slots 175 and moves the sleeve 167 upwardly relative to the stabilizer tube 164. This movement of the sleeve 167 by the shaft 94a in turn moves the friction members 174 against the channel beams 32 and 33 to thereby frictionally lock the lift 163 against movement longitudinally of the slide unit 30. It is apparent, of course, that but slight frictional pressure is produced between the brake members 174 and the channel beams 32 and 33 on initial contact of the friction members with the beams, and that this pressure is progressively increased on a continued movement of the sleeve 167 relative to the stabilizer tube 164, with the continued relative movement being permitted by virtue of the compression of the springs 171 between the plate members 169 and 172. It is seen, therefore, that the lift 163 is free to move longitudinally on the side unit 30 to a position for centering the car 67 relative to the hoist structure, and when such centered position is attained, to be frictionally locked in a fixed position relative to the side unit 30.

The provision of the springs 171 does not definitely limit a maximum longitudinal movement of the sleeve 167 relative to the stabilizer tube 164 so that frictional locking of the lift 163 on the side unit 30 can be made over a range of travel of the sleeve 167 relative to a tube 164. This variable braking action for the lift 163 is of importance in accommodating any slight variations in the action of the switch 131 on the lift 45, for concurrently stopping all of the lifts after a car 67 has been elevated to a desired elevation. It is to be noted further that the extension of the shaft 94a outwardly from the slots 175 positively holds the car attachable unit 58a against rotation relative to the sleeve 167 whereby the unit 58a is locked against both lateral movement and rotational movement.

From a consideration of the above description it is seen that my invention provides an automobile hoist comprised of a plurality of lifts each of which has an extensible flexible lifting means adapted to be stabilized against lateral movement when the object lifted is at any desired elevation. Further all of the lifts are carried on an overhead frame and attachable to an upper part of the car so that when the car is in an elevated position its under side, as well as the floor below and around the car, is entirely free and open. All parts at the under side of the car are, therefore, completely accessible, while all portions of the floor below the car are available for locating and moving any tools and equipment which may be required for work on the car. It is apparent also that when the car is in an elevated position a completely free working space is available for the manipulation of working tools. This free working space in conjunction with the stabilizing of the car against lateral movement provides for a maximum of convenience and efficiency in service work on the car. Also because of the self-centering feature of my hoist appreciable time and labor are saved in the car elevating operation.

Although I have described and illustrated my hoist as having four lifts, each of which is provided with a stabilizing means, it is to be understood that the stabilizing of two or more lifts may be sufficient to maintain the car against lateral movement in any direction when the car is in an elevated position.

It is to be understood further that although my invention has been described with respect to several preferred embodiments thereof that it is not to be so limited since modifications and alterations can be made therein which are within the full intended scope of my invention as defined by the appended claims.

I claim:

1. In an automobile hoist, the combination of an elevated support, a plurality of automobile-engaging and supporting devices carried by said support, means for jointly raising and lowering said devices, certain of said supporting devices being movable relative to their support and to other ones of said supporting devices and relative to an automobile to be lifted, whereby an operator may easily place said supporting devices in selected positions on an automobile even though the automobile is not accurately centered relative to the hoist, said movable supporting devices, when a hoisting movement is commenced, being moved to accurately centered positions relative to the automobile.

2. An automobile hoist comprising a frame supported in elevated position, a plurality of flexible hoisting members depending from said frame, means supported by the lower end of each hoisting member for attaching said lower end to an automobile, means movably mounting certain of said hoisting members on said frame to move toward and from other ones of said hoisting members and relative to an automobile supported therebeneath, means for actuating said hoisting members to lift an automobile, the movable hoisting members being mounted to move freely, when lifting strain is applied to the hoisting members, to such positions that all of the hoisting members will assume substantially vertical positions, and means stabilizing the lower ends of said hoisting members against horizontal movement when said lower ends are at a predetermined elevation.

3. An automobile hoist comprising a frame supported in elevated position, a plurality of automobile engaging and lifting devices depending from said frame, means movably mounting certain of said engaging and lifting devices on said frame for movement relative to other ones of said engaging and lifting devices, and relative to an automobile supported beneath said engaging and lifting devices, means for actuating said engaging and lifting devices to elevate an automobile, said movable engaging and lifting devices being mounted to move freely, when lifting strain is applied to said lifting devices, so that all of said lifting devices assume substantially upright positions, and means for stabilizing the lower ends of said lifting devices against horizontal movement when said lower ends are at a predetermined point of elevation.

4. An automobile hoist comprising a frame supported in elevated position, a plurality of automobile engaging and lifting devices depending from said frame, means movably mounting certain of said engaging and lifting devices on said frame for movement relative to other ones of said engaging and lifting devices, and relative to an automobile supported beneath said engaging and lifting devices, means for operating said engaging and lifting devices to elevate an automobile, said movable engaging and lifting devices being mounted to move freely, when lifting strain is applied to said lifting devices, so that all of said lifting devices assume substantially vertical poistions, means stabilizing the lower ends of said lifting devices against horizontal movement when said lower ends are at a predetermined point of elevation, and means for holding said movable lifting devices against horizontal movement relative to said frame after the automobile has been hoisted to said predetermined elevation.

5. An automobile hoist comprising a frame supported in elevated position, a plurality of automobile engaging and lifting devices depending from said frame, means movably mounting certain of said engaging and lifting devices on said frame for movement relative to other ones of said engaging and lifting devices, and relative to an automobile supported beneath said engaging and lifting devices, means for actuating said engaging and lifting devices to elevate an automobile, said movable engaging and lifting devices being mounted to move freely, when lifting strain is applied to said lifting devices, so that all of said lifting devices assume substantially upright positions, means stabilizing the lower ends of said lifting devices against horizontal movement when said lower ends are at a predetermined point of elevation, and means actuated by upward movement of said automobile, as it is hoisted to said elevated position, for firmly holding the movable lifting devices against horizontal movement relative to said frame after the automobile has been elevated to said predetermined position.

6. An automobile hoist comprising a frame supported in an elevated position, a plurality of stabilizing devices mounted on said frame, certain of which are linearly movable thereon, a flexible hoisting member extended through each stabilizing device, means at the lower end of each flexible hoisting member for attaching it to an automobile, and means for actuating all of said flexible hoisting members to raise and lower an automobile when the movable stabilizing devices are in any moved position on said frame.

7. An automobile hoist comprising a frame supported in an elevated position, a plurality of stabilizing devices mounted on said frame, certain of which are linearly movable across the frame, a flexible hoisting member extended vertically through each of said stabilizing devices, means at the lower end of each flexible hoisting member for attaching it to an automobile, means for actuating all of said flexible hoisting means to raise and lower an automobile when said movable stabilizing devices are in any moved position on said frame, and means actuated by the upward movement of said hoisting members to a predetermined position of elevation for firmly holding the movable stabilizers against movement relative to said frame at said elevated position.

8. In an automobile hoist the combination of a main frame, a stabilizing member movably mounted on said main frame, an automobile engaging and lifting device movable with the stabilizing member, means for raising and lowering said lifting device, a friction member mounted for movement relative to the stabilizing member and operatively connected thereto and normally spaced from said frame, and means actuated by movement of the lifting device to a predetermined elevated position for moving said friction member into engagement with said frame to hold said stabilizing member against movement.

9. A hoist including frame means, a plurality of supporting units depending from said frame means, a flexible lifting means for each of said units, means adjacent the lower end of each lifting means adapted for attachment with an object to be lifted, means providing for the movement of said attachment means to a predetermined height, and means rigid on said frame for contacting certain of said attachment means, at said predetermined height, to stabilize said certain attachment means against lateral movement.

10. A hoist including a frame, a plurality of lifting means each of which includes a rigid member depending from said frame and a flexible lifting means movable in an up and down direction adjacent said depending member, means at the lower end of each of said lifting means attachable to an object to be lifted, means for moving said attachable means to a predetermined height, with said attachable means being laterally movable at all heights below said predetermined height, a portion of each of said depending members engageable with a corresponding attachable means, at said predetermined height, to hold said attachable means against any lateral movement.

11. A hoist including a frame, a flexible lifting device depending from said frame, means for holding the lower end of said lifting device against any lateral movement when said lower end is raised to a certain position including a member depending from said frame adjacent said lifting device, means supporting said depending member against lateral movement, and means carried adjacent the lower end of said lifting means, attachable with an object to be lifted, with said depending member contacting said attachable means at said certain position to hold the lower end of said device against any lateral movement.

12. A hoist including a frame, a flexible lifting device depending from said frame, means at the lower end of said lifting device attachable with an object to be lifted, means for moving said attachable means over a range of heights, and means carried on said frame for contacting said attachable means at any height in said range of heights to hold said attachable means against lateral movement.

13. A hoist including a frame, a plurality of flexible lifting devices depending from said frame, means rigidly supported on said frame adjacent to each of said flexible lifting devices, means carried by each flexible lifting device for engaging a corresponding one of said supported means to hold said lifting devices against lateral movement when said lifting devices have been moved to a certain elevation, means for moving said lifting devices, and means actuated by the movement of said lifting devices to control the operation of said moving means to define said certain elevation of the lifting devices.

14. A hoist including a frame, a flexible lifting device depending from said frame, means for raising and lowering said lifting device, means rigidly supported on said frame adjacent said lifting device, and means carried adjacent the lower end of said lifting device attachable with an object to be lifted, said attachable means being movable into engagement with said supported means, at a certain elevation of said lower end, and held against lateral movement at said elevation.

15. A hoist including a frame, a flexible lifting device depending from said frame, means for moving and holding said lifting device in a moved position, means rigidly supported from said frame adjacent said lifting device, means at the lower end of said lifting device attachable with an object to be lifted, said attachable means, when said lifting device is in a predetermined moved position, being engageable with said rigidly supported means and held against lateral movement, and means on said rigidly supported means for holding said lifting device in a moved position independently of said moving means.

16. A hoist including a frame, a lift depended from said frame including a flexible lifting means, means for raising and lowering said lifting means, an upright member adjacent the lower end of said lifting means attachable with an object to be elevated, and a tubular stabilizing member rigid on said frame and depended therefrom, said lifting means being extended through said stabilizing member, with said upright member receivable within the lower end of said stabilizing member with the outer periphery thereof in contacting engagement with the inner peripheral surface of said stabilizing member to hold the lower end of said lifting means against lateral movement.

17. A hoist including a frame, a lift depended from said frame including a flexible lifting means, means for raising and lowering said lifting means, an upright member adjacent the lower end of said lifting means having a downwardly tapered top portion, and a bottom portion attachable with an object to be elevated, a tubular stabilizing member rigid on said frame and depended therefrom, said flexible means being extended through said stabilizing member with said upright member movable into and out of the lower end of said stabilizing member, said lower end of the stabilizing member being tapered outwardly and downwardly and co-operating with the top portion of said upright member to guide said upright member within said lower end, with said upright member being slidably movable within said stabilizing member to support the lower end of said lifting means against lateral movement.

18. A hoist including a supporting frame, a lift depended from said frame including a flexible lifting means, means for raising and lowering said lifting means, an upright member adjacent the lower end of said lifting means attachable to an object to be lifted, means for supporting said upright member against lateral movement, when it is in an elevated position, including a tube member rigid on said frame, a second tube member movably mounted on said first tube and movable from the lower end of said first tube to adjusted positions, and means for locking said second tube in an adjusted position, said lifting means being extended through said two tubes and said upright member being receivable within the end of said second tube and in contacting engagement with the inner periphery thereof.

19. A hoist including a frame, a lift supported from said frame including flexible lifting means, an upright member adjacent the lower end of said lifting means and attachable to an object to be lifted, means for raising and lowering said lifting means, means providing for the stability of said upright member against lateral movement at any predetermined elevated position including a pair of telescoping members one of which is rigid on said frame and depended therefrom, and the other of which telescoping members is movable longitudinally to adjusted positions relative to the lower end of said one telescoping member, and means for locking said other telescoping member in an adjusted position, said lifting means being movable within said two telescoping members, and said upright member being receivable in the lower end of said other telescoping member for guidable support therein.

20. A hoist including a supporting frame and a flexible lifting means, means for elevating and lowering said lifting means, an upright member adjacent the lower end of said lifting means and attachable with an object to be lifted, means for supporting said upright member in an elevated position against lateral and rotational movement including a tubular stabilizing member rigid on said frame and depended therefrom, with the lower end portion of said stabilizing member having oppositely arranged longitudinally extended slots therein, said slots being open at the lower end of said stabilizing member, and said lifting means positioned within said stabilizing member, said upright member being receivable in the lower end of said stabilizer member and guidably supported therein, and means projected laterally outwardly from said upright member receivable in said slots when said upright member is in said stabilizing member.

21. A hoist including a frame, a lift movably supported on said frame and including a flexible lifting means, means for elevating and lowering said lifting means, means at the lower end of said lifting means attachable with an object to be lifted, means movable with said lift for stabilizing said attachable means against lateral movement at a predetermined elevated position, friction means yieldably mounted on said stabilizing means for movement into and out of engagement with said frame and normally spaced from said frame, and means actuated by movement of said attachable means to said predetermined elevated position for moving said friction means into engagement with said frame to hold said lift against movement relative to said frame.

22. In a hoist, an elevated supporting frame including a pair of oppositely arranged fixed end units, a side unit fixed between said end units, a second side unit movably supported on said end units for lateral movement toward and away from said fixed side unit, a lifting device adjacent each end of said two side units, said lifting devices being oppositely arranged on said two side units, with a pair of opposite lifting devices movable longitudinally relative to their corresponding side units, and means for jointly raising and lowering said lifting devices, said lifting devices being depended from said frame and each thereof having a lower portion attachable with an object to be lifted, with said movable side unit and movable lifting devices being concurrently movable during an elevating operation to center all of said lifting devices relative to the object being elevated.

23. In an automobile hoist, an elevated support having a pair of oppositely arranged fixed frame units, a third frame unit extended between said pair of frame units and fixed relative thereto, a fourth frame unit movably supported on said pair of frame units for movement toward and away from said third frame unit, a pair of automobile-engaging and supporting devices depended from each of said third and fourth frame units, said devices being oppositely arranged on said frame, with one pair of opposite devices movable together toward and away from the other pair of opposite devices, and means for jointly raising and lowering said devices, said fourth frame unit and said one pair of opposite devices being concurrently movable, during an elevating operation, to provide for the centering of all of said devices relative to the automobile being elevated.

ELMER B. THOMPSON.